United States Patent
Pence et al.

(10) Patent No.: US 12,049,319 B2
(45) Date of Patent: Jul. 30, 2024

(54) SLANTED AIRCRAFT SEAT PRIVACY PANELS

(71) Applicant: B/E Aerospace, Inc., Winston-Salem, NC (US)

(72) Inventors: Tracy Pence, King, NC (US); Michael M. Princip, Winston-Salem, NC (US); Mark B. Dowty, Rural Hall, NC (US); Glenn A. Johnson, Rural Hall, NC (US); Jefferey M. McKee, Duvall, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 284 days.

(21) Appl. No.: 17/116,879

(22) Filed: Dec. 9, 2020

(65) Prior Publication Data
US 2022/0106044 A1 Apr. 7, 2022

Related U.S. Application Data

(63) Continuation-in-part of application No. 17/062,050, filed on Oct. 2, 2020, now Pat. No. 11,708,163.

(51) Int. Cl.
*B64D 11/06* (2006.01)

(52) U.S. Cl.
CPC ...... *B64D 11/0606* (2014.12); *B64D 11/0602* (2014.12); *B64D 11/064* (2014.12); *B64D 11/0641* (2014.12)

(58) Field of Classification Search
CPC .................................................. B64D 11/0606
See application file for complete search history.

(56) References Cited

U.S. PATENT DOCUMENTS

| 6,113,183 A | 9/2000 | Koch et al. |
| 6,688,691 B2 | 2/2004 | Marechal et al. |

(Continued)

FOREIGN PATENT DOCUMENTS

| EP | 1417113 A1 * | 5/2004 | ............... B60N 2/20 |
| EP | 1817228 B1 | 8/2009 | |

(Continued)

OTHER PUBLICATIONS

Extended Search Report in European Application No. 21200212.5 dated Feb. 2, 2022, 7 pages.

(Continued)

*Primary Examiner* — Timothy D Collins
*Assistant Examiner* — Terri L Filosi
(74) *Attorney, Agent, or Firm* — Suiter Swantz IP

(57) ABSTRACT

A slanted aircraft seat privacy panel may include a body. The body may be defined by a contour line along at least a portion of a height of the body. The contour line may be a straight line slanted at an angle relative to a vertical line. The vertical line may be defined relative to a floor of the aircraft cabin. The contour line being slanted may generate increased shoulder space in the passenger compartment in the aircraft cabin. The increased shoulder space in the passenger compartment may use a portion of non-fully utilized space in an adjacent passenger compartment in the aircraft cabin. The passenger compartment and the adjacent passenger compartment may be offset relative to an aisle in the aircraft cabin. A portion of each of the passenger compartment and the adjacent passenger compartment may be formed by the slanted aircraft seat privacy panel.

14 Claims, 10 Drawing Sheets

(56) References Cited

U.S. PATENT DOCUMENTS

| | | |
|---|---|---|
| 6,698,836 B1 | 3/2004 | Veneruso |
| 8,177,165 B2 | 5/2012 | Bettell |
| 8,573,537 B2 | 11/2013 | Bock |
| 8,882,035 B2 | 11/2014 | France et al. |
| 8,998,138 B2 | 4/2015 | Ferry et al. |
| 9,004,599 B2 | 4/2015 | Collins et al. |
| 9,216,826 B2 | 12/2015 | Orson et al. |
| 9,403,597 B2 | 8/2016 | Ferry et al. |
| 9,856,025 B2 | 1/2018 | Jasny et al. |
| 10,351,244 B2 | 7/2019 | Cooke et al. |
| 10,370,108 B1 | 8/2019 | Williams |
| 2010/0163674 A1 | 7/2010 | Bock |
| 2012/0223186 A1 | 9/2012 | Henshaw |
| 2015/0130244 A1 | 5/2015 | Wyss |
| 2018/0222589 A1* | 8/2018 | Papke ............... B64D 11/0619 |
| 2019/0092475 A1 | 3/2019 | Carlioz et al. |
| 2019/0308734 A1 | 10/2019 | Perera et al. |
| 2019/0315467 A1 | 10/2019 | Nicholas |
| 2019/0322371 A1 | 10/2019 | Dowty et al. |
| 2020/0130840 A1 | 4/2020 | Frost et al. |

FOREIGN PATENT DOCUMENTS

| | | | |
|---|---|---|---|
| EP | 3079985 B1 | 10/2018 | |
| EP | 3526120 A1 | 8/2019 | |
| EP | 3546358 B1 | 4/2020 | |
| GB | 2555123 A | 4/2018 | |
| WO | 03013903 A1 | 2/2003 | |
| WO | WO-03013903 A1 * | 2/2003 | ............... B60N 2/20 |
| WO | WO-2019239204 A1 * | 12/2019 | ......... B64D 11/0606 |

OTHER PUBLICATIONS

Extended Search Report in European Application No. 21199964.4 dated Feb. 11, 2022, 11 pages.

* cited by examiner

SLANTED AIRCRAFT SEAT PRIVACY PANELS

CROSS-REFERENCE OF RELATED APPLICATIONS

The present application is a continuation-in-part of and claims benefit of the earliest available effective filing date of U.S. application Ser. No. 17/062,050, filed on Oct. 2, 2020, titled STATIC AIRCRAFT SEAT PRIVACY PANELS, which is incorporated herein in the entirety.

BACKGROUND

Aircraft cabin designs may include aircraft interior structures such as privacy panels. The privacy panels may be coupled to or be integrated into a structure of an aircraft seat. The coupling or integrating of the privacy panels with the aircraft seat may require the privacy panels and/or the aircraft seat to be over-engineered. The coupling or integrating of the privacy panels with the aircraft seat may require the privacy panels to be tested in a similar manner and/or be required to meet similar aviation guidelines and/or standards as the aircraft seat.

SUMMARY

A passenger compartment is disclosed, in accordance with one or more embodiments of the disclosure. The passenger compartment may include a slanted aircraft seat privacy panel. The slanted aircraft seat privacy panel may include a body. At least a portion of a surface of the body may be shaped to at least partially conform with at least a portion of an aircraft seat. The aircraft seat may be configured to couple to a floor of an aircraft cabin at a first location. The body may be defined by a contour line along at least a portion of a height of the body. The contour line may be a straight line slanted at an angle relative to a vertical line. The vertical line may be defined relative to the floor of the aircraft cabin. The slanted aircraft seat privacy panel may include a lower edge of the body. The lower edge may be positioned proximate to a surface of the floor when the body is coupled to the floor at a second location separate from the first location where the aircraft seat is coupled. The contour line being slanted may generate increased shoulder space in the passenger compartment in the aircraft cabin. The passenger compartment may include the aircraft seat. The increased shoulder space in the passenger compartment may use a portion of non-fully utilized space in an adjacent passenger compartment in the aircraft cabin. The passenger compartment and the adjacent passenger compartment may be offset relative to an aisle in the aircraft cabin. A portion of each of the passenger compartment and the adjacent passenger compartment may be formed by the slanted aircraft seat privacy panel.

In some embodiments, the lower edge of the body of the slanted aircraft seat privacy panel may be configured to be flush with the surface of the floor of an aircraft cabin when the body is coupled to the floor via the set of floor-mounted components.

In some embodiments, the lower edge of the body of the slanted aircraft seat privacy panel may be configured to be separated by a gap from the surface of the floor of the aircraft cabin when the body is coupled to the floor.

In some embodiments, the aircraft seat may be compliant with 16G force requirements for aviation transport. The slanted aircraft seat privacy panel may be compliant with at least one of 9G force requirements or 16G force requirements for aviation transport.

In some embodiments, the slanted aircraft seat privacy panel may further include an upper edge of the body. The upper edge may be configured to be separated by a gap from a surface of one or more overhead structures positioned proximate to a ceiling of the aircraft cabin.

In some embodiments, the slanted aircraft seat privacy panel may further include an upper edge of the body. The upper edge may be configured to be separated by a gap from a surface of one or more overhead structures positioned proximate to a ceiling of the aircraft cabin.

In some embodiments, the slanted aircraft seat privacy panel may further include a filler component configured to fit within the gap formed by the offset between the upper edge of the body and the surface of the one or more overhead structures.

In some embodiments, the aircraft seat may be able to actuate between at least one of a raised position, a bed position, or at least one lounge position.

In some embodiments, the at least the portion of the surface of the body of the slanted aircraft seat privacy panel may be configured to conform to a portion of an aircraft seat when the aircraft seat is the raised position, the bed position, or the at least one lounge position.

In some embodiments, the passenger compartment may further include an ottoman. The ottoman may be configured to be stowed to allow access to the aircraft seat when the aircraft seat is in the raised position. The ottoman may be configured to be deployed for use when the aircraft seat is in the bed position.

In some embodiments, the passenger compartment may further include an ottoman. The ottoman may be fixed in position proximate to the aircraft seat within the passenger compartment.

In some embodiments, the passenger compartment may further include an auxiliary component positioned in front of the aircraft seat within the passenger compartment. The auxiliary component may be configured to be deployed when the aircraft seat is in the raised position. The auxiliary component may be configured to be stowed when the aircraft seat is in the bed position.

In some embodiments, the passenger compartment may further include an auxiliary component positioned behind the aircraft seat within the passenger compartment.

In some embodiments, the auxiliary component may be configured to be stowed when the aircraft seat is in the raised position. The auxiliary component may be configured to be deployed when the aircraft seat is in the bed position.

In some embodiments, the surface of the body of the slanted aircraft seat privacy panel may be a first surface. The body may include a second surface opposite the first surface. At least a portion of the second surface may be shaped to at least partially conform with at least a portion of a second aircraft seat in the adjacent passenger compartment.

A passenger compartment is disclosed, in accordance with one or more embodiments of the disclosure. The passenger compartment may include a slanted aircraft seat privacy panel. The slanted aircraft seat privacy panel may include a body. At least a portion of a surface of the body may be shaped to at least partially conform with at least a portion of an aircraft seat. The aircraft seat may be configured to couple to a floor of an aircraft cabin at a select location. The body may be defined by a contour line along at least a portion of a height of the body. The contour line may be a straight line slanted at an angle relative to a vertical line. The vertical line may be defined relative to a floor of the aircraft cabin. The slanted aircraft seat privacy panel may include a lower edge of the body. The lower edge may be positioned proximate to a surface of the floor when the body is coupled to the floor at the select location where the aircraft seat is coupled. The contour line being slanted may generate increased shoulder space in the passenger compartment in the aircraft cabin. The passenger compartment may include the aircraft seat. The increased should space in the passenger compartment may use a portion of non-fully utilized space in an adjacent passenger compartment in the aircraft cabin. The passenger compartment and the adjacent passenger compartment may be offset relative to an aisle in the aircraft cabin. A portion of each of the passenger compartment and the adjacent passenger compartment may be formed by the slanted aircraft seat privacy panel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
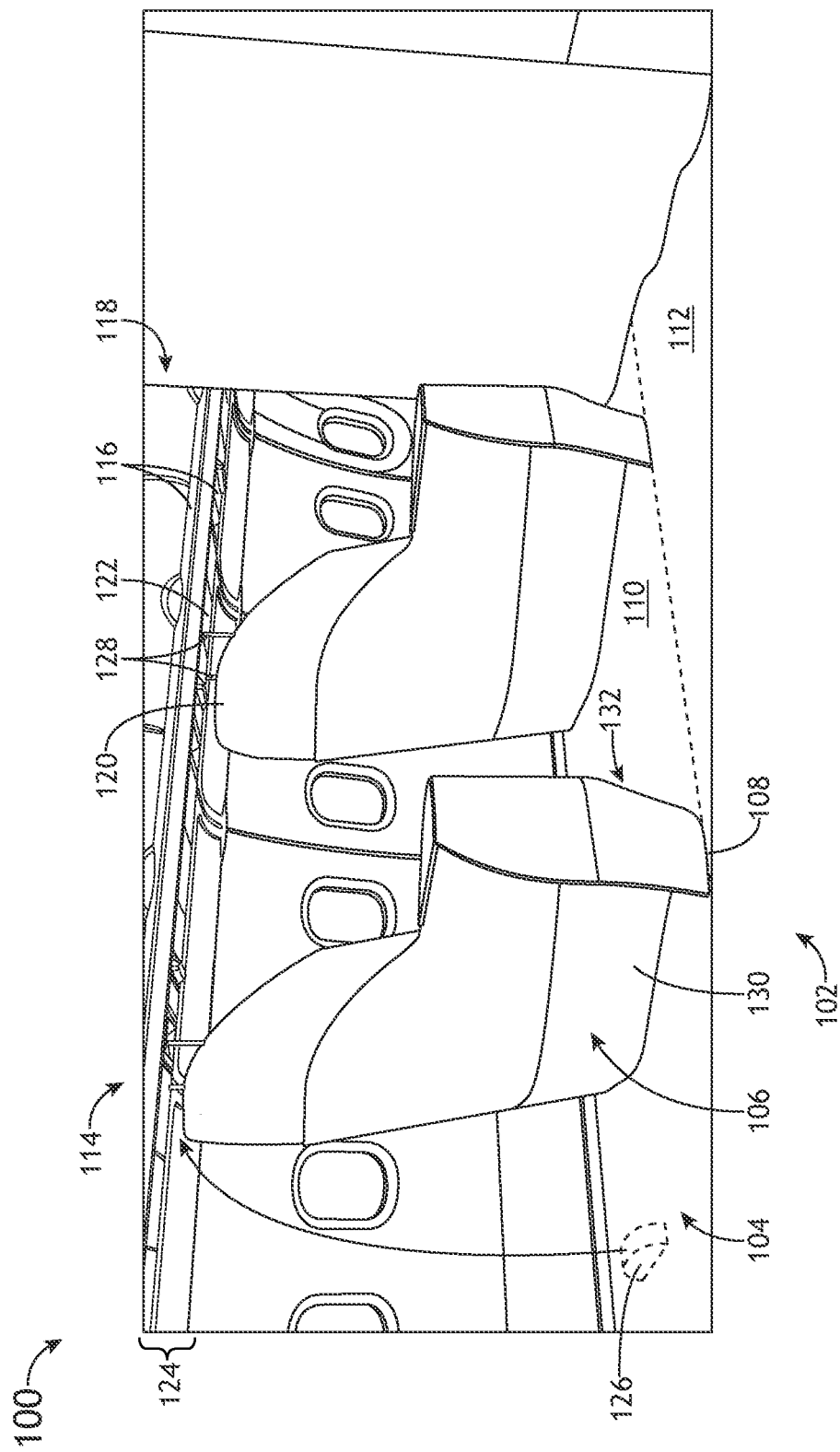
FIG. 1A illustrates an aircraft cabin including slanted aircraft seat privacy panels, in accordance with one or more embodiments of the disclosure.
Figure 1B:
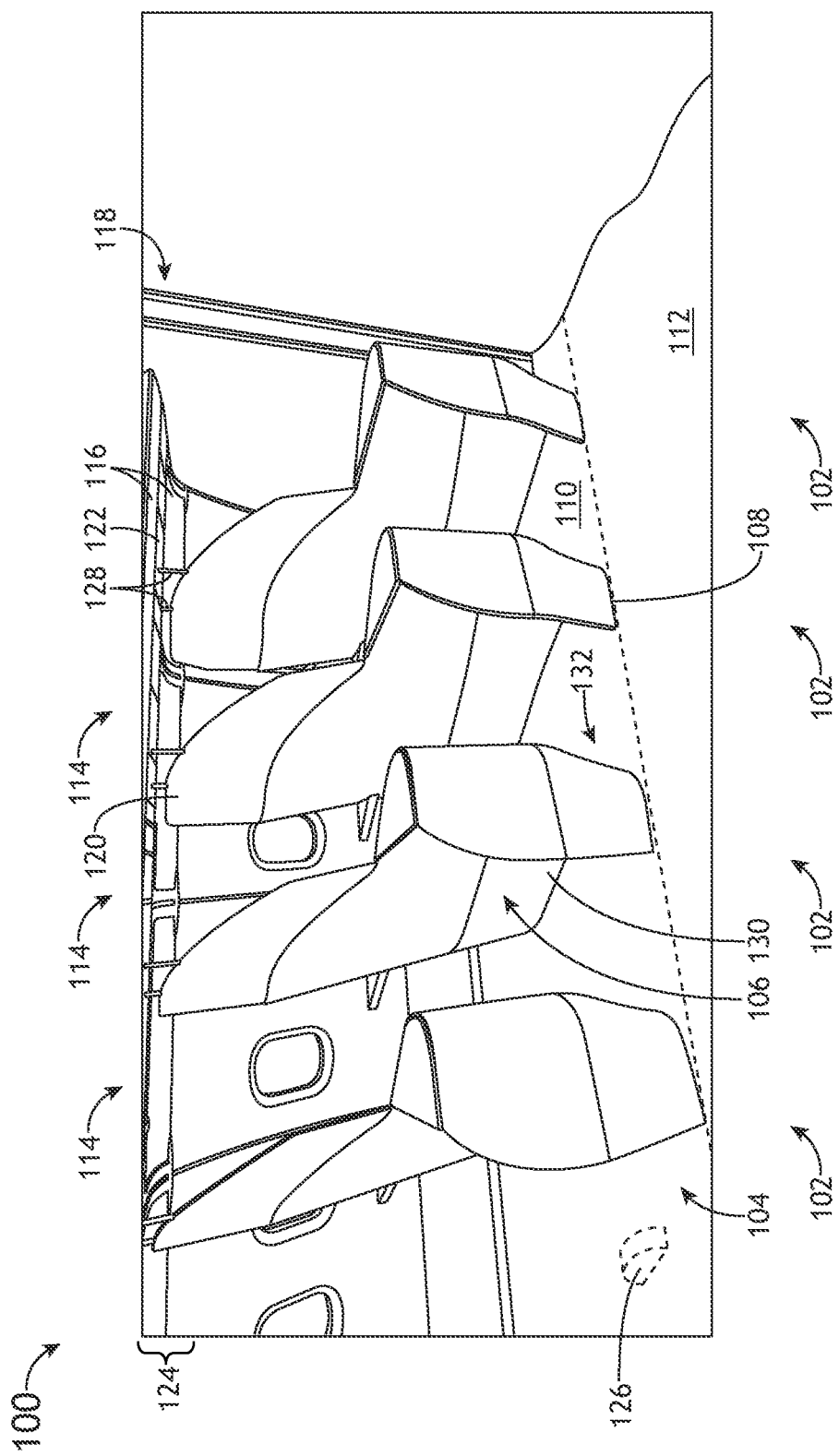
FIG. 1B illustrates an aircraft cabin including slanted aircraft seat privacy panels, in accordance with one or more embodiments of the disclosure.
Figure 1C:
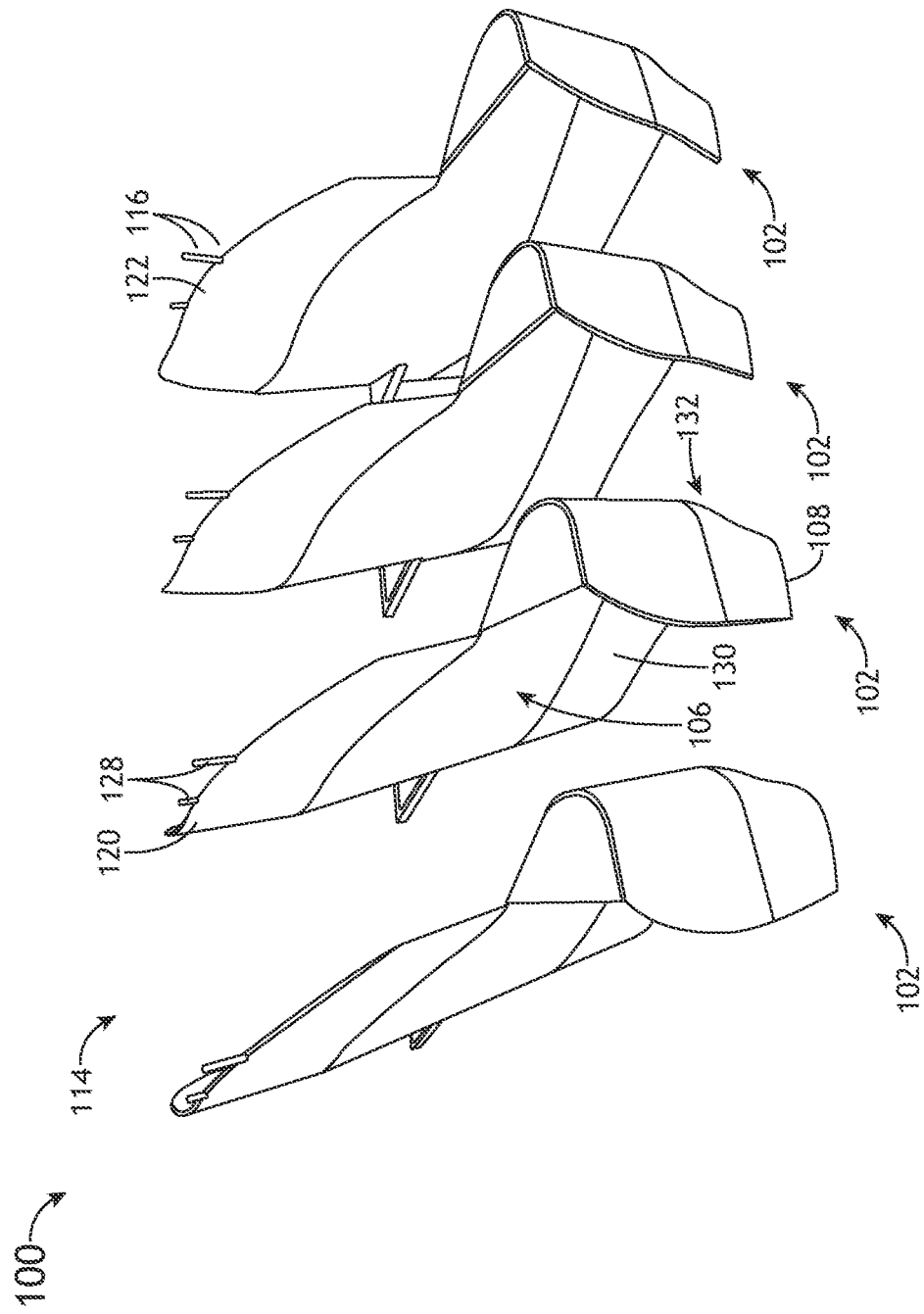
FIG. 1C illustrates slanted aircraft seat privacy panels, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-3 in general illustrate slanted aircraft seat privacy panels, in accordance with one or more embodiments of the disclosure.

Aircraft cabin designs may include aircraft interior structures such as privacy panels (e.g., partitions, shells, screens, or the like). The privacy panels may be coupled to or integrated with a structure of an aircraft seat. For example, the privacy panels may be coupled to or integrated with the structure of the aircraft seat, such that aircraft seat tracks coupling the aircraft seat to the aircraft cabin take on any load exerted by the privacy panels.

The coupling of the privacy panels to or integrating of the privacy panels with the aircraft seat may require the privacy panels and/or the aircraft seat to be over-engineered. For example, the design of the privacy panels and/or the aircraft seat may include unnecessary constraints to ensure the correct interface between the privacy panels and the aircraft seat. By way of another example, the design of the privacy panels and/or the aircraft seat may include unnecessary constraints to ensure the correct interface between the aircraft cabin and the privacy panels and/or the aircraft seat.

The coupling of the privacy panels to or integrating of the privacy panels with the aircraft seat may require the privacy panels to be tested in a similar manner and/or be require to meet similar aviation guidelines and/or standards as the aircraft seat. Load-bearing/weight-bearing force requirements must be met without losing the intended functionality of the privacy panels and/or the aircraft seat in the aircraft cabin. For example, the privacy panels and/or the aircraft seat in the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. For instance, both the aircraft seat and the coupled-to or integrated-with privacy panels may be tested as a dynamic object needing to be compliant with 16G force requirements, in contrast to a static object only needing to be able to be compliant with 9G force requirements, per aviation guidelines and/or standards in the most recent versions of the codes set forth in at least 14 C.F.R. Part 25, AIRWORTHINESS STANDARDS: TRANSPORT CATEGORY AIRPLANES (e.g., codes including, but not limited to, 14 C.F.R. § 25.561 (or FAR 25.561), 14 C.F.R. § 25.562 (or FAR 25.562), or the like) in effect at the time of filing. The additional amount of testing required to obtain the increased level of certification may add risk, weight, cost, and complexity to one or more of the privacy panels, the aircraft seat, and/or the certification process.

As such, it would be beneficial to provide slanted aircraft seat privacy panels. For example, the slanted aircraft seat privacy panels may be configured to only need to meet a 9G certification standard instead of the more restrictive 16G certification standard, while still forming a portion of a first-class or business-class aircraft cabin passenger compartment, by not being coupled to aircraft seats. In addition, the slanted aircraft seat privacy panel may be coupled to one or more locations within the aircraft cabin on which a load may be exerted in place of the aircraft seat tracks. The combination of the non-coupling to the one or more aircraft seats and the direct coupling to the one or more locations within the aircraft cabin may allow for a lighter or less-weight slanted aircraft seat privacy panel design with removable panels (e.g., for review of internal components within the one or more slanted aircraft seat privacy panels).

FIGS. 1A-3 in general illustrate an aircraft cabin 100, in accordance with one or more embodiments of the disclosure.

The aircraft cabin 100 may include one or more slanted aircraft seat privacy panels 102. It is noted herein "slanted aircraft seat privacy panels" and variants of the term including, but not limited to, "slanted privacy panels," "privacy panels," or the like may be considered equivalent, for purposes of the disclosure. In addition, "panels," "partitions," "shells," and "screens" may be configured equivalent, for purposes of the disclosure.

The one or more privacy panels 102 may be coupled to a floor 104 of the aircraft cabin 100. For example, the one or more privacy panels 102 may be coupled to one or more floor-mounted components 300 set within the floor or coupled to the floor 104 of the aircraft cabin 100. For instance, the one or more floor-mounted components 300 may include, but are not limited to, tracks, rails, brackets, or other floor-mounted components.

A privacy panel 102 may include a body 106. A lower edge 108 of the body 106 may be flush with a surface 110 of the floor 104 when the one or more privacy panels 102 are coupled to the floor 104. For example, the flushness of the lower edge 108 with the surface 110 may prevent dropped or set-down items from shifting between adjacent passenger compartments 114 formed or defined at least in part from the one or more privacy panels 102. It is noted herein "passenger compartment," "passenger suite," and "compartment suite" may be considered equivalent, for purposes of the disclosure.

The one or more privacy panels 102 may include or may be implemented as a divider panel or structure separating adjacent passenger compartments 114 and/or between a passenger compartment 114 from an open area within the aircraft cabin 100. For example, where the one or more privacy panels 102 are implemented as separators, the one or more privacy panels 102 may be configured to allow for the multiple passenger compartments 114 to be installed within the aircraft cabin 100 in a more compact arrangement. The compact arrangement of the multiple passenger compartments 114 may result in an increased design space in the areas of the aircraft cabin 100 surrounding the one or more privacy panels 102 for other aircraft interior structures and/or monuments while continuing to meet aviation guidelines and/or standards. For example, the increased design space may allow for the addition of more passenger compartments 114 and/or components within the passenger compartments 114, more monuments and/or structures throughout the aircraft cabin 100, or the like. In this regard, the one or more privacy panels 102 may be considered components of the one or more passenger compartments 114.

A spacing between adjacent privacy panels 102 forming at least a part of a passenger compartment 114 may be an opening configured to lead to an aisle 112 of the aircraft cabin 100. The opening may include a door. For example, the door may swing or slide into an open position against the one or more privacy shell elements. By way of another example, a privacy panel 102 may be at least partially hollow, and the door may be slid into a cavity defined in the one or more privacy panel 102.

It is noted herein the lower edge 108 may be offset or separated from the surface 110 a selected distance to provide a gap between the one or more privacy panels 102 and the floor 104. Where there is a gap, in one non-limiting example the gap may be filled in with a filler component fabricated from a solid soft material (e.g., a foam block or shield, a rubber block or shield, or the like), a solid hard material (e.g., a plastic block or shield, a metal block or shield, or the like), a fluidic hardening material (e.g., caulk or other sealing compound), or the like. For instance, the filer component may prevent access to attachment studs (e.g., fasteners such as washers, threaded nuts, bushings, spacers, or the like) coupling the one or more privacy panels 102 to the one or more floor-mounted components 300. It is noted herein the gap and/or the filler component may prevent the one or more privacy panels 102 and the floor 104 from rubbing and/or making noise.

The one or more privacy panels 102 may include one or more overhead structures 116 coupled to a ceiling 118 of the aircraft cabin 100. For example, the one or more overhead structures 116 may include, but are not limited to, a luggage bin structure, a passenger service unit structure, or the like. The one or more privacy panels 102 may be coupled to the one or more overhead structures 116 of the aircraft cabin 100. The one or more privacy panels 102 may be coupled to one or more ceiling-mounted components 302 within the aircraft cabin 100 proximate to (e.g., underneath, exterior, or the like) to the one or more overhead structures 116. For example, the one or more ceiling-mounted components 302 may include, but are not limited to, tracks, rails, brackets, or other mounted components. For instance, where the ceiling-mounted components 302 are underneath the one or more overhead structures 116, one or more brackets or linkages may pass between adjacent overhead structures 116 or through the one or more overhead structures 116 to couple to the ceiling-mounted components 302. In this regard, the one or more privacy panels 102 may be coupled to the aircraft cabin 100 proximate to the one or more overhead structures 116.

An upper edge 120 of the body 106 may be offset or separated from a surface 122 of the one or more overhead structures 116 a selected distance to provide a gap 124 between the upper edge 120 and the surface 122. For example, the gap 124 may be filled in with a filler component 126 fabricated from a soft material (e.g., a foam block, a rubber block, or the like) or a hard material (e.g., a plastic, or the like). For instance, the filler component 126 may prevent access to attachment studs 128 (e.g., fasteners such as washers, threaded nuts, bushings, spacers, or the like) coupling the one or more privacy panels 102 to the one or more overhead structures 116 and/or the ceiling-mounted components 302. In addition, the filler component 126 may prevent the one or more privacy panels 102 and the one or more overhead structures 116 from rubbing and/or making noise. One or more dimensions of at least a portion of the gap 124 may be dependent on the spacing or distance between the upper edge 120 and the surface 122. For example, at least a portion of the gap 124 may be ½-inch in height, corresponding to a ½-inch distance between the upper edge 120 and the surface 122. It is noted herein, however, the gap 124 may be any height.

It is noted herein the upper edge 120 may be flush with the surface 122 when the one or more privacy panels 102 are coupled to the one or more overhead structures 116.

The one or more privacy panels 102 (and thus the one or more passenger compartments 114) may be oriented in any direction within the aircraft cabin 100. For example, the one or more privacy panels 102 (and thus the one or more passenger compartments 114) may be set at an angle relative to the aisle 112 through the aircraft cabin 100. It is noted herein the angling of the one or more privacy panels 102 may result in an increased design space in the areas of the aircraft cabin 100 surrounding the one or more privacy panels 102 for other aircraft interior structures and/or monuments while continuing to meet aviation guidelines and/or standards. For instance, the increased design space may allow for the addition of more passenger compartments 114 and/or components within the passenger compartments 114, more monuments and/or structures throughout the aircraft cabin 100, or the like. In addition, it is noted herein the angling of the one or more privacy panels 102 may result in a greater separation of passengers occupying the passenger compartments 114 formed at least in part by the one or more privacy panels 102, resulting in a possible increased level of protection from airborne-transmitted diseases. By way of another example, the one or more privacy panels 102 (and thus the one or more passenger compartments 114) may be set orthogonal relative to the aisle 112 through the aircraft cabin 100. By way of another example, the one or more privacy panels 102 (and thus the one or more passenger compartments 114) may be set parallel to the aisle 112 through the aircraft cabin 100.

The aircraft cabin 100 may include one or more aircraft seats 200 (e.g., business class or first-class passenger seats) positioned proximate to the one or more privacy panels 102. It noted herein the terms "aircraft seats" and "passenger seats" may be considered equivalent, for purposes of the disclosure.

In general, an aircraft seat 200 may be translatable (e.g., trackable or slidable). The aircraft seat 200 may be rotatable about an axis cross-wise through the aircraft seat 200 into a position including, but not limited to, an upright or raised position, one or more lounge or reclined positions, and a lie-flat or bed position. For example, the aircraft seat 200 may transition directly between the upright position and the lie-flat or bed position. By way of another example, it is noted herein the aircraft seat 200 may transition through one or more reclined positions between the upright position and the lie-flat or bed position. By way of another example, the aircraft seat 200 may transition into one or more reclined positions in a motion separate from the transition between the upright position and the lie-flat or bed position. Therefore, the above description should not be interpreted as a limitation on the scope of the disclosure but merely an illustration.

The aircraft seat 200 may be rotatable about an axis (e.g., swivelable). The aircraft seat 200 may be fully positionable between the outer limits of motion as defined by the moveable components of the aircraft seat 200, the one or more privacy panels 102, and/or one or more auxiliary components or structures 202 of the passenger compartment 114. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 200 may be actuatable (e.g., translatable and/or rotatable) from the TTOL position to a non-TTOL position, and/or vice versa. Further, it is noted herein the aircraft seat 200 may be capable of a fully upright or raised position, and that the TTOL position may have a more reclined seat back cushion and a more angled upward seat pan cushion as compared to the fully upright or raised position. Therefore, the above description should not be interpreted as a limitation on the present disclosure but merely an illustration.

The aircraft seat 200 may be configured to avoid contact with the one or more privacy panels 102 and/or the one or more auxiliary components or structures 202 when transitioning between positions (e.g., between the upright or raised position and the lie-flat or bed position).

At least one dimension of the one or more privacy panels 102 may be defined by a flat plane, such that the body 106 of the one or more privacy panels 102 may include surfaces 130, 132 that are flat or substantially flat. It is noted herein, however, that the flat surfaces 130, 132 of the body 106 may require a considerable amount of design space within the aircraft cabin 100. This requirement of design space may result in a loss of valuable space (e.g., floor space, storage or stowage space, or the like) within the aircraft cabin 100, which may be problematic where aircraft cabin designs need to address competing interests for increased passenger seating, storage space, lavatories, galley spaces, and other structures and/or monuments.

To offset loss of valuable space, the one or more privacy panels 102 may be shaped to at least partially conform to the one or more aircraft seats 200.

For example, the at least the portion of the body 106 may be shaped to at least partially conform to the one or more aircraft seats 200. For instance, at least the portion of a surface 130 of the body 106 may conform to at least a portion of a first aircraft seat 200, while at least the portion of a surface 132 of the body 106 may conform to at least a portion of a second aircraft seat 200.

By way of another example, portions of the one or more privacy panels 102 may be shaped to at least partially conform to the one or more aircraft seats 200 when the one or more aircraft seats 200 are in or transitioning between positions (e.g., the upright or raised position, the one or more lounge or reclined positions, and/or the lie-flat or bed position). For instance, at least a first portion of a surface 130 and/or at least a first portion of a surface 132 of the body 106 may conform to at least a first portion of an aircraft seat 200 when the aircraft seat 200 is in a first position, and at least a second portion of a surface 130 and/or at least a second portion of a surface 132 of the body 106 may conform to at least a second portion of the aircraft seat 200 when the aircraft seat 200 is in a second position. In addition, at least a first portion of a surface 130 and/or at least a first portion of a surface 132 of the body 106 may conform to at least a first portion of an aircraft seat 200 when the aircraft seat 200 is in a first position, at least a second portion of a surface 130 and/or at least a second portion of a surface 132 of the body 106 may conform to at least a second portion of the aircraft seat 200 when the aircraft seat 200 is in a second position, and at least a third portion of a surface 130 and/or at least a third portion of a surface 132 of the body 106 may conform to at least a third portion of the aircraft seat 200 when the aircraft seat 200 is in a third position.

The shaping or conforming of the one or more privacy panels 102 to the one or more aircraft seats 200 may provide a more three-dimensional contouring to the one or more privacy panels 102 as compared to a flat or substantially flat privacy panel 102. The three-dimensional contouring of the one or more privacy panels 102 may result in an increased design space in the areas of the aircraft cabin 100 surrounding the one or more privacy panels 102 for other aircraft interior structures and/or monuments while continuing to meet aviation guidelines and/or standards. For example, the increased design space may allow for the addition of more passenger compartments 114 and/or components within the passenger compartments 114, more monuments and/or structures throughout the aircraft cabin 100, or the like.

Figure 2A:
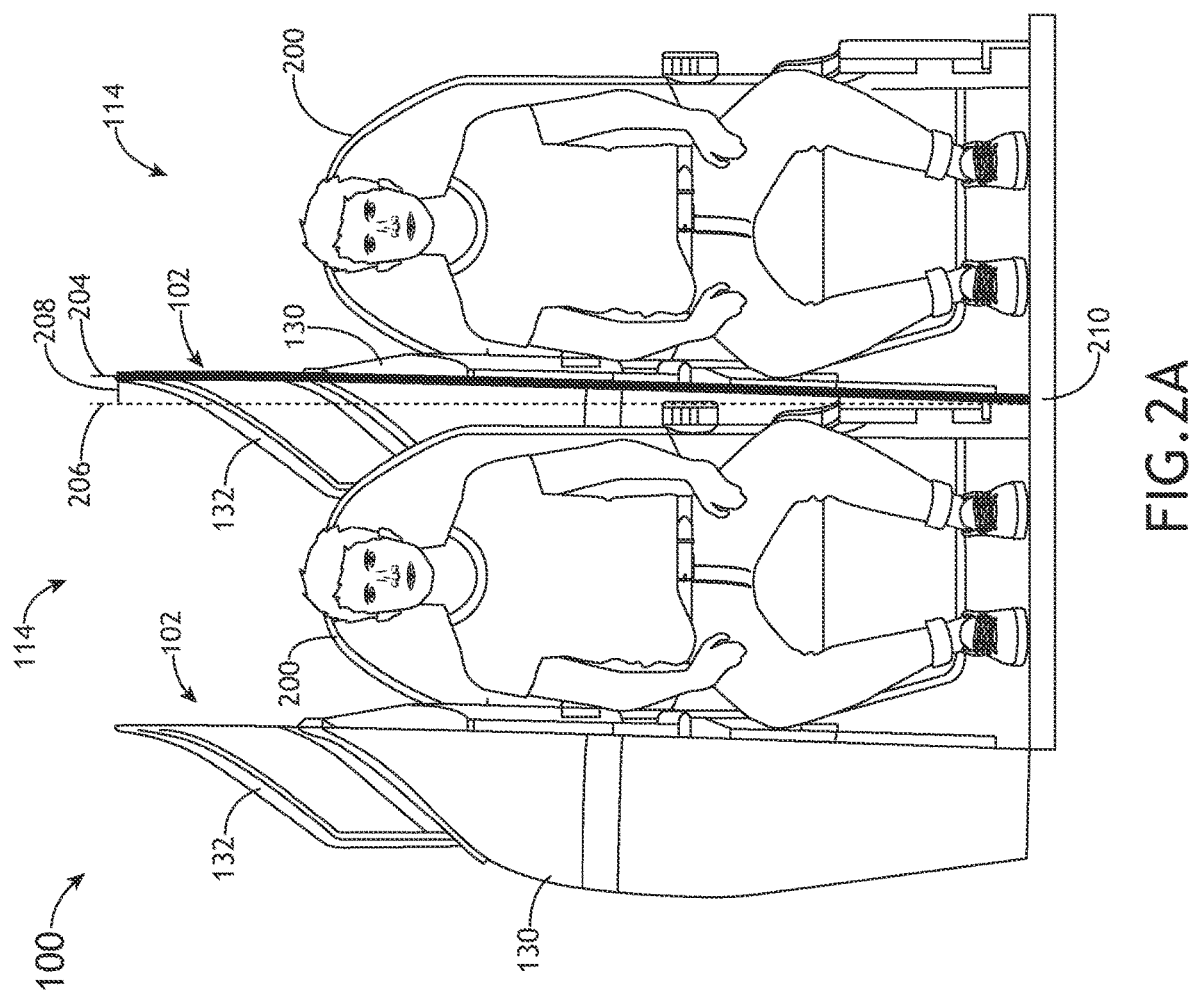
FIG. 2A illustrates an aircraft cabin including slanted aircraft seat privacy panels and aircraft seats, in accordance with one or more embodiments of the disclosure.
Figure 2B:
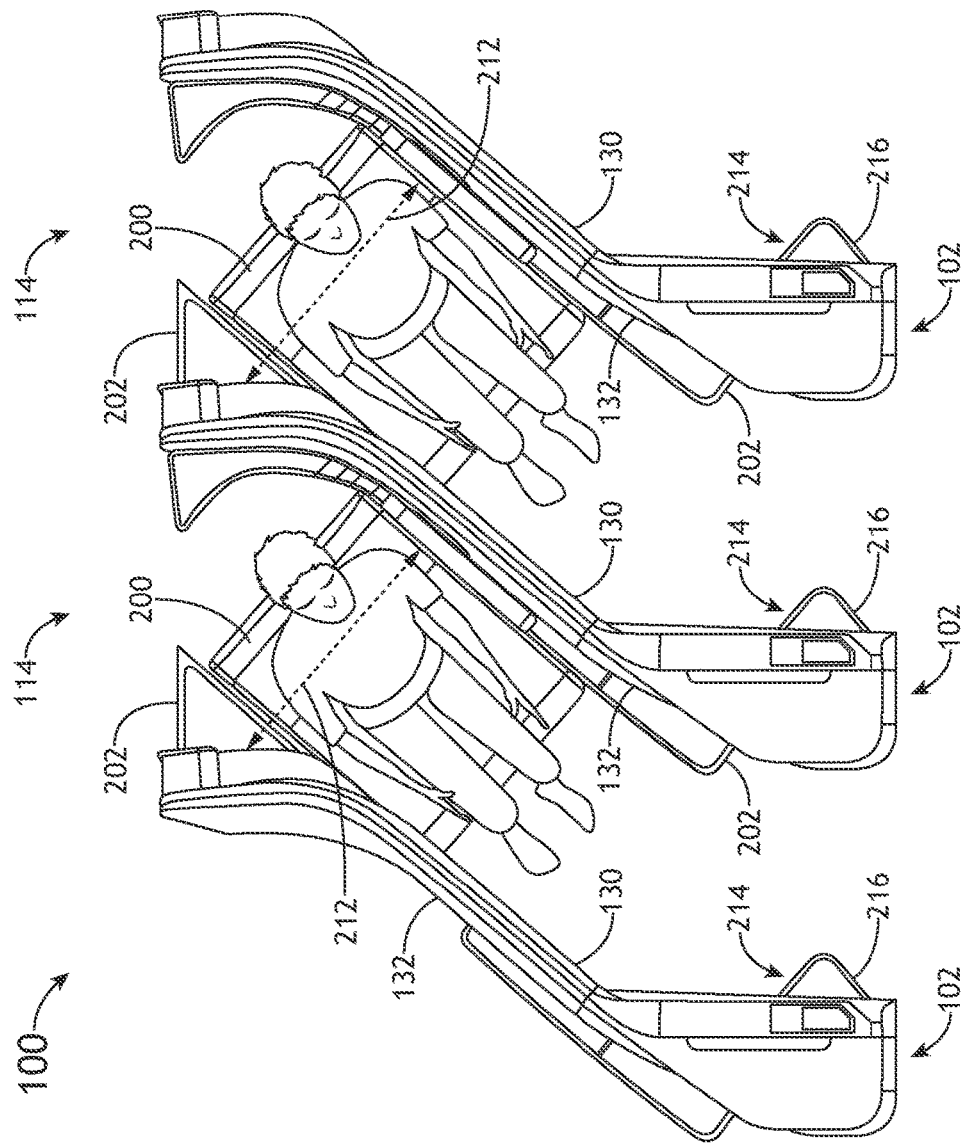
FIG. 2B illustrates an aircraft cabin including slanted aircraft seat privacy panels and aircraft seats, in accordance with one or more embodiments of the disclosure.
Figure 2C:
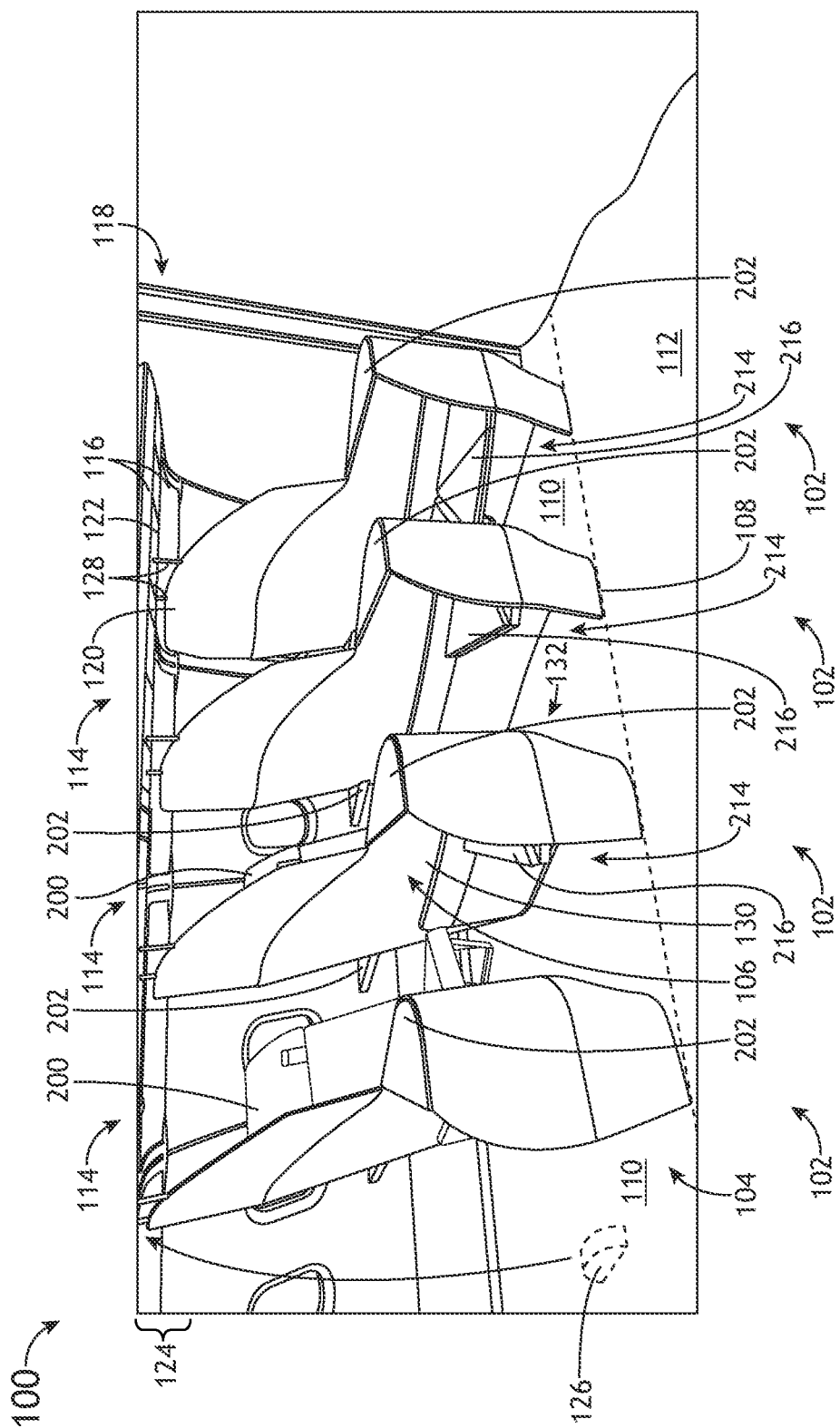
FIG. 2C illustrates an aircraft cabin including slanted aircraft seat privacy panels and aircraft seats, in accordance with one or more embodiments of the disclosure.
Figure 2D:
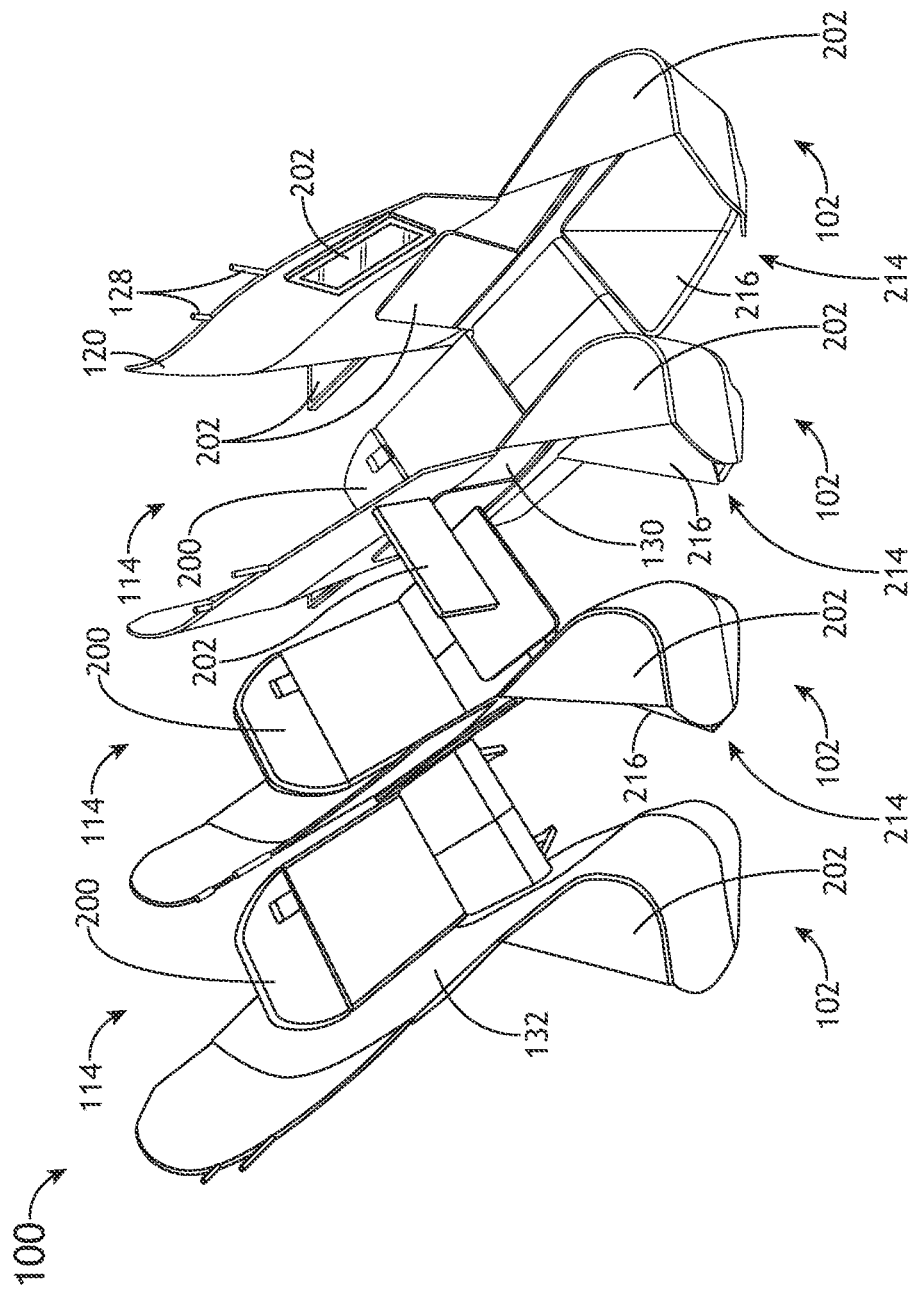
FIG. 2D illustrates an aircraft cabin including slanted aircraft seat privacy panels and aircraft seats, in accordance with one or more embodiments of the disclosure.
Figure 2E:
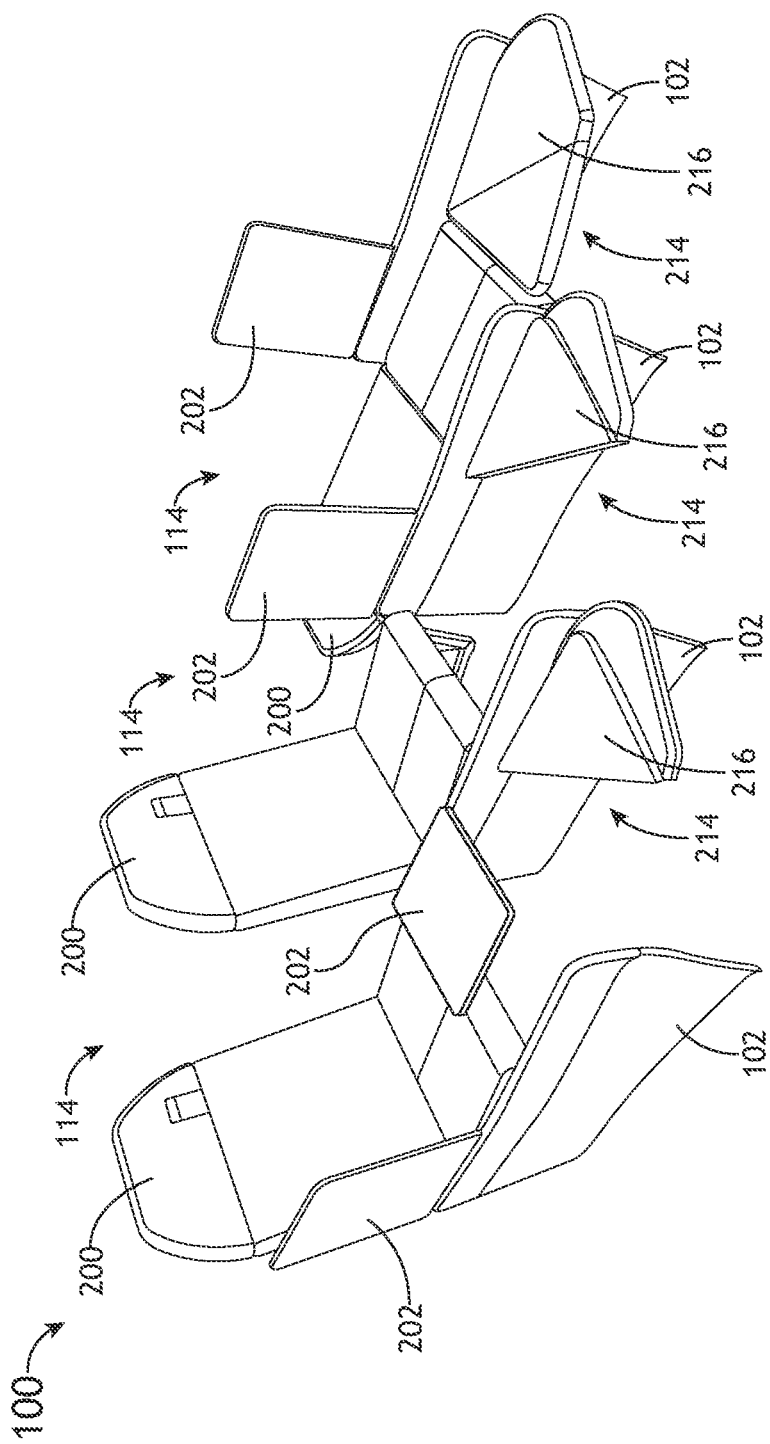
FIG. 2E illustrates an aircraft cabin including slanted aircraft seat privacy panels and aircraft seats, in accordance with one or more embodiments of the disclosure.
Figure 2F:
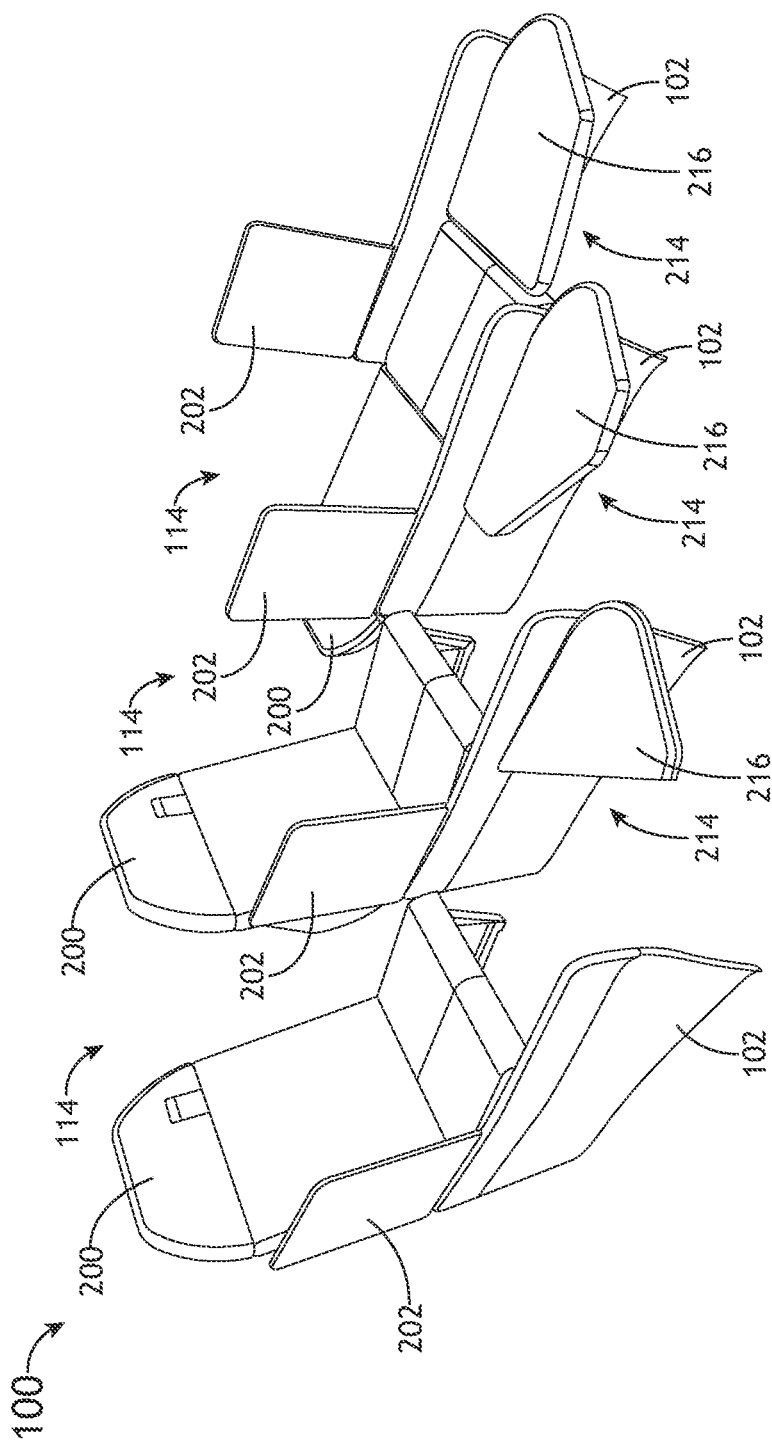
FIG. 2F illustrates an aircraft cabin including slanted aircraft seat privacy panels and aircraft seats, in accordance with one or more embodiments of the disclosure.
Figure 3:
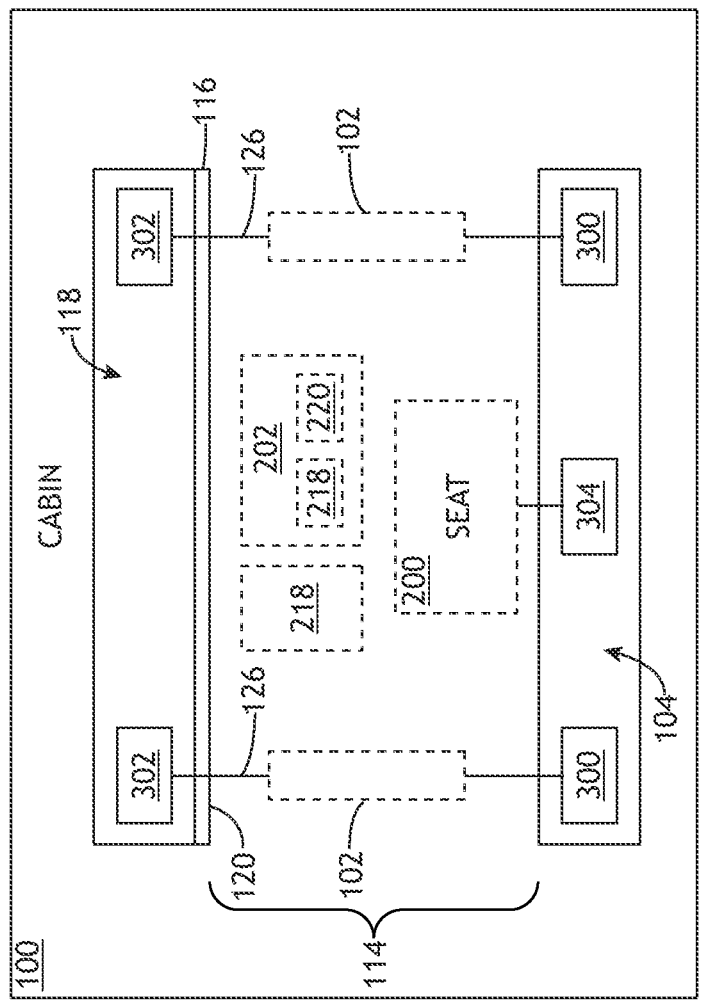
FIG. 3 is a simplified block diagram of an aircraft cabin including slanted aircraft seat privacy panels and aircraft seats, in accordance with one or more embodiments of the disclosure.

In one non-limiting example, as illustrated in at least FIGS. 2A and 2B, the body 106 of a privacy panels 102 may include a profile along at least a portion of the height of the body 106, where the profile traces and/or is otherwise defined by a contour line 204. For example, the contour line 204 may be a straight line through a shared space including a shared privacy panel 102 between adjacent passenger compartments 114, where the shared privacy panel 102 forms a portion of each of the adjacent passenger compartments 114. By way of another example, the contour line 204 may be slanted at an angle relative to a vertical (or substantially vertical) line 206 defined within the aircraft cabin 100, where the vertical (or substantially vertical) line 206 is defined perpendicular (or substantially perpendicular) to a horizontal (or substantially horizontal) surface of the floor 104 of the aircraft cabin 100. For instance, the slant direction may be away from the aircraft seat 200 (e.g., and thus a passenger occupying the aircraft seat 200) within a particular aircraft compartment 114 in a single direction along the contour line 204 upward from the floor 104, while keeping the profile of the body 106 straight, such that the contour line 204 is separated from the vertical (or substantially vertical) line 206 a selected distance 208. It is noted herein the slanting a single part in one direction differs from offsetting a lower portion of the shared privacy panel 102 from an upper portion of the shared privacy panel 102, as the contour line 204 and the vertical (or substantially vertical) line 206 may be considered as meeting at an intersection point 210 on the floor 104 as opposed to meeting at an intersecting point at some location along the height of the body 106 of the shared privacy panel 102.

It is noted herein the contour line 204 may have a corresponding contour plane, the vertical (or substantially vertical) line 206 may have a corresponding vertical (or substantially vertical) plane, and the intersecting point 210 may have a corresponding intersecting line on the floor 104 when viewed along an surface 130 or 132 of the shared privacy panel from a corresponding passenger compartment 114 of the adjacent passenger compartments 114. Here, the contour plane may meet with the vertical (or substantially vertical) plane at the intersecting line on the floor 104 as opposed to meeting at an intersecting line at some location up the height of the body 106 of the shared privacy panel 102.

Where a first passenger compartment 114 and a second passenger compartment 114 are offset, such that a first aircraft seat 200 in the first passenger compartment 114 is set in front of (or forward relative to) a second aircraft seat 200 in the second passenger compartment 114 (e.g., as defined based on a distance from the aisle 112), the slanted or angled privacy panel 102 may allow for increased shoulder space 212 proximate to the aircraft seat 200 of the first passenger compartment 114 in any of the upright or raised position, the one or more lounge or reclined positions, and/or the lie-flat or bed position.

Although the increased shoulder space 212 in the first passenger compartment 114 may encroach on space otherwise reserved for the second passenger compartment 114 (e.g., reserved if the one or more privacy panels 102 were vertical (or substantially vertical)), the offset relationship of the adjacent passenger compartments 114 means only non-utilized space (e.g., a walkway, a foot area, or the like) or non-fully utilized space (e.g., a storage compartment, a knee area, or the like) in the second passenger compartment 114 would be affected by the encroaching of the first passenger compartment 114. In this regard, space usage within the aircraft cabin 100 may be further improved upon, resulting in an increase of available floor space for other aircraft interior structures and/or monuments while continuing to meet aviation guidelines and/or standards.

The one or more privacy panels 102 may not be coupled to the one or more aircraft seats 200, such that the one or more privacy panels 102 and the one or more aircraft seats 200 may be separately coupled to the aircraft cabin 100. For instance, the one or more privacy panels 102 may be coupled to the one or more floor-mounted components 300. In addition, the one or more privacy panels 102 may be coupled to the one or more overhead structures 116 or to the one or more ceiling-mounted components 302 proximate to the one or more overhead structures 116. Further, the one or more aircraft seats 200 may be coupled to the floor 104 via one or more seat tracks or rails 304.

By not coupling the one or more privacy panels 102 to the one or more aircraft seats 200, the one or more privacy panels 102 may not need to be designed to meet a dynamic load requirement set forth by aviation standards and/or guidelines (e.g., a 16G force requirement) such as that required for the one or more aircraft seats 200, but instead may be designed to meet a static load requirement set forth by aviation standards and/or guidelines (e.g., a 9G force requirement). In addition, the coupling of the one or more privacy panels 102 to the floor 104 and the one or more overhead structures 116 may allow for a more effective distribution of applied loads at the ends of the privacy panels 102, as opposed to through locations where the one or more privacy panels 102 couple to the one or more aircraft seats 200, requiring the one or more aircraft seats 200 to transfer the applied loads through the aircraft seat tracks or rails 304 within the floor 104. Further, not coupling the one or more privacy panels 102 to the aircraft seats 200 may allow for a lighter or less-weight privacy panel 102 design, being separate from the structure of the aircraft seat 200, with removable panels (e.g., for review of internal components within the one or more privacy panels 102).

It is noted herein the one or more privacy panels 102 may be designed to meet a dynamic load requirement set forth by aviation standards and/or guidelines (e.g., a 16G force requirement, as codified in the above-listed examples) in addition to or instead of the static load requirement. For example, the one or more privacy panels 102 may be coupled to the aircraft seat 200, and may be designed to meet a dynamic load requirement set forth by aviation standards and/or guidelines (e.g., a 16G force requirement, as codified in the above-listed examples) being coupled to the aircraft seat 200. By way of another example, the one or more privacy panels 102 may be designed to meet a dynamic load requirement set forth by aviation standards and/or guidelines (e.g., a 16G force requirement, as codified in the above-listed examples) although the one or more privacy panels 102 and the aircraft seat 200 are independently coupled to the floor 104 of the aircraft cabin 100.

It is noted herein the one or more privacy panels 102 and the one or more aircraft seats 200 may be considered components of a slanted aircraft seat privacy panel system, for purposes of the disclosure.

The one or more auxiliary components 202 may include one or more surfaces. For example, the one or more auxiliary components 202 may include, but are not limited to, a tray or table, a side stand, an arm rest, or the like. The one or more auxiliary components 202 may include one or more electronics or electronic devices. For example, the one or more electronics or electronic devices may include, but are not limited to, one or more aircraft seat 200 actuation devices (e.g., assemblies, controls, actuators, and/or the like), one or more passenger compartment accessories or installations, or the like. For instance, the one or more accessories or installations may include, but are not limited to, one or more lights or lighted panels, one or more stowable in-flight entertainment (IFE) devices (e.g., video displays, video monitors, or the like), one or more fixed IFE devices, one or more speakers configured to provide media content separate from or accompanying the media content shown on the IFE devices, or the like.

The aircraft seat 200 may be configured to avoid contact with the one or more auxiliary components 202 when transitioning between positions (e.g., between the upright or raised position and the lie-flat or bed position).

For example, the passenger compartment 114 may include an upright or raised position auxiliary component 202 positioned in front of the aircraft seat 200 and proximate to a privacy panel 102 within the passenger compartment 114. For instance, the upright or raised position auxiliary component 202 proximate to the privacy panel 102 may be configured to be deployed when the aircraft seat is in the raised position, and configured to stowed when the aircraft seat is in the bed position.

By way of another example, the passenger compartment 114 may include a lie-flat or bed auxiliary component 202 positioned behind the aircraft seat 200 and proximate to a privacy panel 102 within the passenger compartment 114. For instance, the lie-flat or bed auxiliary component 202 proximate to the privacy panel 102 may be configured to be stowed when the aircraft seat is in the raised position and configured to deployed when the aircraft seat is in the bed position. In addition, the lie-flat or bed auxiliary component 202 may be fixed in place, where doing so would not interfere with the actuation of the aircraft seat 200 between the upright or raised position and the lie-flat or bed position. It is noted herein the upright or raised position auxiliary component 202 may be positioned proximate to the privacy panel 102 at a greater height from the surface of the floor 104 than the lie-flat or bed auxiliary component 202.

The auxiliary component 202 may include a top surface, a bottom surface, and/or one or more side surfaces. For example, the auxiliary component 202 may include a single continuous side surface where all corners are rounded. By way of another example, the auxiliary component 202 may include up to an N number of side surfaces where the auxiliary monument 202 includes up to an N number of corners.

The auxiliary component 202 may be fixed in position. It is noted herein, however, that the auxiliary component 202 may be actuatable. For example, the auxiliary component 202 may extend a select distance from a stored position to an extended position proximate to a passenger, similar to an aircraft tray table. In addition, the auxiliary component 202 may fold out from and/or return to a stowed position (e.g., against a particular privacy panel 102), similar to an aircraft tray table.

The one or more auxiliary components 202 may be proximate to one or more divider panels 102 used as a separator between adjacent passenger compartments 114 and/or between a passenger compartment 114 and an open area within the aircraft cabin 100. For example, the one or more auxiliary components 202 may be positioned above, below, behind, in front of, or beside one or more divider panels 102. The one or more auxiliary components 202 may be integrated into the one or more divider panels 102 and used as a separator between adjacent aircraft seats 200 and/or between an aircraft seat 200 and an open area within the aircraft cabin 100. Where the one or more auxiliary components 202 are implemented as separators, the one or more auxiliary components 202 may be configured to allow for the multiple passenger compartments 114 to be installed within the aircraft cabin 100 in a more compact arrangement. The compact arrangement of the multiple passenger compartments 114 may result in an increased design space in the areas of the aircraft cabin 100 surrounding the one or more auxiliary components 202 for other aircraft interior structures and/or monuments while continuing to meet aviation guidelines and/or standards. For example, the increased design space may allow for the addition of more passenger compartments 114 and/or components within the passenger compartments 114, more monuments and/or structures throughout the aircraft cabin 100, or the like. In this regard, the one or more auxiliary components 202 may be considered components of the one or more passenger compartments 114.

The passenger compartment 114 may include one or more footwells 214 configured to be usable by one or more passengers in the one or more aircraft seats 200 positioned proximate to the one or more privacy panels 102. The passenger compartment 114 may include one or more ottomans 216 positioned within the one or more footwells 214. For example, as illustrated in at least FIG. 2E, the one or more ottomans 216 may be configured to transition between a first position and at least a second position. For instance, at least a portion of an ottoman 216 may be configured to translate, may be configured to rotate about an axis, or may be configured to translate and rotate about an axis. By way of another example, as illustrated with various configurations in FIG. 2F, the one or more ottomans 216 may be fixed in place.

An ottoman 216 may be usable by a passenger in an aircraft seat 200 positioned proximate to the one or more privacy panels 102 when the corresponding aircraft seat 200 is in a lie-flat or bed position. For example, the ottoman 216 may form a portion of a bed surface when the corresponding aircraft seat 200 is in the lie-flat or bed position. The ottoman 216 may be usable by a passenger in an aircraft seat 200 positioned proximate to the one or more privacy panels 102 when the corresponding aircraft seat 200 is in a reclined or lounge position.

The ottoman 216 may be positioned within a footwell 214 of the passenger compartment 114. For instance, one or more dimensions of the footwell 214 may be changed by transitioning the aircraft seat 200 between the upright or raised position, a lounge or reclined position, and the lie-flat or bed position. It is noted herein that a portion of the ottoman 216 may be actuatable (e.g., along a set of tracks or linear rails) to a position outside of the footwell 214.

The ottoman 216 may be configured to translate and/or rotate about an axis through a sidewall of the ottoman 216 to point a top surface to a passenger occupying the aircraft seat 200. For example, where the ottoman 216 may be configured to both translate and rotate, the ottoman 216 may be configured to independently rotate and/or translate. By way of another example, where the ottoman 216 may be configured to both translate and rotate, a rotation may prevent further translation until the ottoman 216 is returned to a select position and/or a translation may prevent further rotation until the ottoman 216 is returned to a select position.

The one or more ottomans 216 may include one or more sections. For example, an ottoman 216 may include multiple sections configured to stow or deploy depending on the usage of the passenger compartment 114. For instance, the ottoman 216 may be stowed to allow access to the aircraft seat 200, such as when the aircraft seat 200 of the passenger compartment 114 is in the upright or raised position. In addition, the ottoman 216 may be deployed for use when the aircraft seat 200 of the passenger compartment 114 is in the lounge or reclined position, or the lie-flat or bed position.

It is noted herein, however, the aircraft seat 200 and/or the ottoman 216 may be limited to an upright or raised position and/or one or more lounge or reclined positions. In addition, it is noted herein the aircraft seat 200 may be the sole component forming a bed when the aircraft seat 200 is in a lie-flat or bed position. Therefore, the above description should not be interpreted as a limitation on the present disclosure but merely an illustration.

It is noted herein the passenger compartment 114 may be configured to include one or more footwells 214 and one or more ottomans 216 for additional passenger compartments 114 positioned underneath the one or more aircraft seats 200, the one or more privacy panels 102, the one or more auxiliary components 202, and/or one or more storage compartments 218 within the passenger compartment 114.

It is noted herein the ottoman 216 may be positioned outside a footwell 214 (e.g., against a particular privacy panel 102), such that the footwell 214 may not be necessary. Therefore, the above description should not be interpreted as a limitation on the present disclosure but merely an illustration.

The passenger compartment 114 may include the one or more storage compartments 218. The one or more storage compartments 218 may be positioned proximate to or integrated within the one or more privacy panels 102, the one or more auxiliary components 202, or the like. The one or more storage compartments 218 may be coupled to and/or at least be partially inset in the one or more privacy panels 102, the one or more auxiliary components 202, or the like.

The one or more storage compartments 218 may include a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation.

The one or more storage compartments 218 may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like.

The one or more storage compartments 218 may include one or more electronic connections for one or more passenger amenities such as, but not limited to, one or more charging ports, one or more charging cables, or the like.

The one or more storage compartments 218 may include one or more electronic connections in communication with one or more components of the passenger compartment 114 such as, but not limited to, one or more display device connection ports, one or more display device connection cables, one or more audio output jacks (e.g., headphone jacks), one or more audio input jacks, or the like.

The one or more storage compartments 218 may include one or more safety devices (e.g., air masks, personal floatation devices, or the like).

The one or more storage compartments 218 may include a door. The one or more storage compartments may be similar to a shelving unit without doors.

The one or more auxiliary components 202 may include storage space similar to that described in the one or more storage compartments 218. The one or more auxiliary components 202 may include a footrest 220 (e.g., similar to or separate from the footwell 214 and/or the ottoman 216).

The passenger compartment 114 may include one or more high-touch areas, or frequent touchpoints in contact with different users, which may have a high potential to transfer microbes (e.g., viruses, pathogens, microorganisms) between the users. In one non-limiting example, the high-touch areas may include portions of the privacy panels 102 such as, but not limited to, the surfaces 130 and 132 of the privacy panels 102, lead edges of the privacy panels 102 proximate to the opening of the passenger compartment 114 configured to lead to the aisle 112 of the aircraft cabin 100, or the like. In another non-limiting example, the high-touch areas may include the aircraft seat 200, the footwell 214, and/or the ottoman 216. In another non-limiting example, the high-touch areas may include the one or more auxiliary components 202 (e.g., a tray or table, a side stand, an arm rest, or the like). The one or more high-touch areas may be protected with coatings (e.g., antimicrobial, antiviral, antibacterial, or the like) configured to prevent the transfer of microbes. For example, the coatings may be in addition to disinfection of the high-touch areas during regular cleanings, fogging, and/or cleaning of the passenger compartment 114.

In this regard, the slanted aircraft seat privacy panels 102 may be configured to only need to meet a 9G certification standard instead of the more restrictive 16G certification standard, while still forming a portion of a first-class or business-class aircraft cabin passenger compartment. To accomplish this, the slanted aircraft seat privacy panel 102 may be a part of the passenger compartment 114 without being coupled to or integrated with the aircraft seat 200. In addition, the slanted aircraft seat privacy panel 102 may be directly coupled to the floor 104 and one or more overhead structures 116, on which a load may be exerted in place of the aircraft seat tracks. The combination of the non-coupling to the one or more aircraft seats 200 and the direct coupling to the floor 104 and one or more overhead structures 116 may allow for a lighter or less-weight slanted aircraft seat privacy panel 102 design with removable panels (e.g., for review of internal components within the one or more slanted aircraft seat privacy panels 102).

It is noted herein the one or more privacy panels 102 is not limited to the aviation environment and/or the aircraft components within the aviation environment. For example, the one or more privacy panels 102 may be configured for any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. By way of another example, the one or more privacy panels 102 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A passenger compartment comprising:
    a slanted aircraft seat privacy panel comprising:
        a body, at least a portion of a flat surface of the body being shaped to at least partially conform with at least a portion of a first aircraft seat, at least a portion of an additional flat surface of the body being shaped to at least partially conform with at least a portion of a second aircraft seat, each aircraft seat being configured to couple to a floor of an aircraft cabin at a first location via a set of seat tracks, the body defined by a contour line along at least a portion of a height of the body, the contour line being a straight line slanted at an angle relative to a vertical line, the vertical line being defined relative to the floor of the aircraft cabin, the contour line and the vertical line meeting at an intersection point on the floor of the aircraft cabin, a slant direction of the contour line being away from the first aircraft seat in a single direction; and
        a lower edge of the body, the lower edge of the body configured to couple to the floor via a set of floor-mounted components, the set of floor-mounted components being positioned within the floor separate from the set of seat tracks of each aircraft seat, the lower edge positioned proximate to a surface of the floor when the body is coupled to the floor at a second location separate from the first location where each aircraft seat is coupled,
    wherein the contour line being slanted generates increased shoulder space in the passenger compartment in the aircraft cabin, the passenger compartment including the first aircraft seat, the increased shoulder space in the passenger compartment using a portion of non-fully utilized space in an adjacent passenger compartment including the second aircraft seat in the aircraft cabin, the passenger compartment and the adjacent passenger compartment being offset relative to an aisle in the aircraft cabin, a portion of each of the passenger compartment and the adjacent passenger compartment being formed by the slanted aircraft seat privacy panel.

2. The passenger compartment of claim 1, the lower edge of the body of the slanted aircraft seat privacy panel being configured to be flush with the surface of the floor of the aircraft cabin when the body is coupled to the floor.

3. The passenger compartment of claim 1, the lower edge of the slanted aircraft seat privacy panel being configured to be separated by a gap from the surface of the floor of the aircraft cabin when the body is coupled to the floor.

4. The passenger compartment of claim 1, each aircraft seat being compliant with 16G force requirements for aviation transport, the slanted aircraft seat privacy panel being compliant with at least one of 9G force requirements or 16G force requirements for aviation transport.

5. The passenger compartment of claim 1, the slanted aircraft seat privacy panel further comprising:
    an upper edge of the body, the upper edge being configured to be flush with a surface of one or more overhead structures positioned proximate to a ceiling of the aircraft cabin.

6. The passenger compartment of claim 1, the slanted aircraft seat privacy panel further comprising:
    an upper edge of the body, the upper edge being configured to be separated by a gap from a surface of one or more overhead structures positioned proximate to a ceiling of the aircraft cabin.

7. The passenger compartment of claim 6, further comprising:
    a filler component configured to fit within the gap between the upper edge of the body and the surface of the one or more overhead structures.

8. The passenger compartment of claim 1, each aircraft seat being able to actuate between at least one of a raised position, a bed position, or one or more lounge positions.

9. The passenger compartment of claim 8, the at least the portion of the flat surface of the body of the slanted aircraft seat privacy panel being configured to conform to a portion of the first aircraft seat when the first aircraft seat is the raised position, the bed position, or the at least one lounge position.

10. The passenger compartment of claim 8, further comprising:
    an ottoman, the ottoman configured to be stowed to allow access to the first aircraft seat when the first aircraft seat is in the raised position, the ottoman configured to be deployed for use when the first aircraft seat is in the bed position.

11. The passenger compartment of claim 8, further comprising:
    an ottoman, the ottoman being fixed in position proximate to the first aircraft seat within the passenger compartment.

12. The passenger compartment of claim 8, further comprising:
    an auxiliary component positioned in front of the first aircraft seat within the passenger compartment, the auxiliary component configured to be deployed when the first aircraft seat is in the raised position, the auxiliary component configured to be stowed when the first aircraft seat is in the bed position.

13. The passenger compartment of claim 8, further comprising:
    an auxiliary component positioned behind the first aircraft seat within the passenger compartment, the auxiliary component configured to be stowed when the first aircraft seat is in the raised position, the auxiliary component configured to be deployed when the first aircraft seat is in the bed position.

14. A passenger compartment comprising:
    a slanted aircraft seat privacy panel comprising:
        a body, at least a portion of a flat surface of the body being shaped to at least partially conform with at least a portion of a first aircraft seat, at least a portion of an additional flat surface of the body being shaped to at least partially conform with at least a portion of a second aircraft seat, each aircraft seat being configured to couple to a floor of an aircraft cabin at a select location via a set of seat tracks, the body defined by a contour line along at least a portion of a height of the body, the contour line being a straight line slanted at an angle relative to a vertical line, the vertical line being defined relative to the floor of the aircraft cabin, the contour line and the vertical line meeting at an intersection point on the floor of the aircraft cabin, a slant direction of the contour line being away from the first aircraft seat in a single direction; and
        a lower edge of the body, the lower edge of the body configured to couple to the floor via a set of floor-mounted components, the set of floor-mounted components being positioned within the floor separate from the set of seat tracks of each aircraft seat, the lower edge positioned proximate to a surface of the floor when the body is coupled to the floor at the select location where each aircraft seat is coupled,
    wherein the contour line being slanted generates increased shoulder space in the passenger compartment in the aircraft cabin, the passenger compartment including the first aircraft seat, the increased shoulder space in the passenger compartment using a portion of non-fully utilized space in an adjacent passenger compartment including the second aircraft seat in the aircraft cabin, the passenger compartment and the adjacent passenger compartment being offset relative to an aisle in the aircraft cabin, a portion of each of the passenger compartment and the adjacent passenger compartment being formed by the slanted aircraft seat privacy panel.

* * * * *